US012179507B2

(12) United States Patent
Pilachowski et al.

(10) Patent No.: US 12,179,507 B2
(45) Date of Patent: Dec. 31, 2024

(54) OFFSET SCORE CONFIGURATION

(71) Applicant: Hallmark Cards, Incorporated, Kansas City, MO (US)

(72) Inventors: Brian Pilachowski, Pleasant Hill, MO (US); Orlanda Lacy, Kansas City, MO (US)

(73) Assignee: HALLMARK CARDS, INCORPORATED, Kansas City, MO (US)

(*) Notice: Subject to any disclaimer, the term of this patent is extended or adjusted under 35 U.S.C. 154(b) by 108 days.

(21) Appl. No.: 18/071,748

(22) Filed: Nov. 30, 2022

(65) Prior Publication Data

US 2024/0174017 A1 May 30, 2024

(51) Int. Cl.
*B42D 15/04* (2006.01)

(52) U.S. Cl.
CPC .................................. *B42D 15/045* (2013.01)

(58) Field of Classification Search
CPC .. G09F 1/06; G09F 1/08; A63H 33/38; B42D 15/04; B42D 15/042
USPC .............. 40/124.01, 124.06, 124.08, 124.09, 40/124.13, 124.14; 281/2, 5, 15.1, 23, 281/51; 283/34, 61, 62, 63.1, 117
See application file for complete search history.

(56) References Cited

U.S. PATENT DOCUMENTS 1,670,254 A * 5/1928 Gowin .................. G09B 29/04 281/5
2,723,078 A * 11/1955 Tilly ...................... B42D 15/08 229/92.8
3,141,549 A 10/1964 Koehler
3,191,328 A 6/1965 Lohnes
3,228,138 A 1/1966 Lohnes
3,798,806 A 3/1974 Sanford
3,995,388 A 12/1976 Penick et al.
4,313,270 A 2/1982 Volkert et al.
(Continued)

FOREIGN PATENT DOCUMENTS

CN 211166053 U 8/2020
DE 921910 C 12/1954
(Continued)

OTHER PUBLICATIONS

Sam Calcott, "Make A Brilliant Double-Sided Pop-Up Card | Easy Pop-Up Card | Original Design," youtube.com. Nov. 1, 2019. https://www.youtube.com/watch?v=S0bxhwb3xb0.
(Continued)

*Primary Examiner* — Cassandra Davis
(74) *Attorney, Agent, or Firm* — STINSON LLP

(57) ABSTRACT

A greeting card has a front cover, a back cover, and an internal protection panel positioned there between. A pop-up is positioned between the front cover and the protection panel. The protection panel may be coupled with the front cover to protect and keep the pop-up in a closed position. The back cover is configured so that in a partially open position it keeps the front cover and protection panel coupled and in a fully open position it keeps the front cover and protection panel in a flat position to allow the pop-up to be more properly displayed. The front cover, protection panel and back cover can be formed from a single piece of cardstock, and the card can be further configured to allow for automated personalized printing.

20 Claims, 10 Drawing Sheets

(56) References Cited

U.S. PATENT DOCUMENTS

| | | | | |
|---|---|---|---|---|
| 4,374,877 | A * | 2/1983 | Cole | G09F 1/06 428/11 |
| 5,022,681 | A | 6/1991 | Penick | |
| 5,568,695 | A | 10/1996 | Kough | |
| 5,738,221 | A | 4/1998 | Van Witt et al. | |
| 5,778,578 | A | 7/1998 | Drapcho et al. | |
| 6,877,263 | B2 | 4/2005 | Clark | |
| 7,111,736 | B2 * | 9/2006 | Petter | B65D 5/4254 40/124.06 |
| 7,836,620 | B2 | 11/2010 | Cole | |
| D652,865 | S | 1/2012 | Sliede | |
| D698,639 | S | 2/2014 | Fletcher et al. | |
| 8,701,315 | B2 | 4/2014 | Glass et al. | |
| 9,090,115 | B2 | 7/2015 | Shields | |
| 9,836,997 | B1 | 12/2017 | Brandrup | |
| D815,201 | S | 4/2018 | Larson et al. | |
| 10,286,715 | B2 | 5/2019 | Aniban, Jr. | |
| 10,500,887 | B1 | 12/2019 | Kelly | |
| 11,027,570 | B2 | 6/2021 | Scholz | |
| 2006/0196787 | A1 | 9/2006 | Lewis | |
| 2023/0302841 | A1 * | 9/2023 | Weyand | B42D 15/08 |

FOREIGN PATENT DOCUMENTS

| | | | |
|---|---|---|---|
| FR | 2476539 | A1 | 8/1981 |
| FR | 2800010 | B1 | 1/2002 |
| FR | 2925971 | B1 | 12/2009 |
| JP | 4915521 | B2 | 4/2012 |
| WO | 2011108923 | A1 | 9/2011 |

OTHER PUBLICATIONS

"Free Pop-Up Z Fold Card Template SVG and Tutorial", Domestic Heights, domesticheights.pdf, Jan. 26, 2021. https://web.archive.org/web/20210126055213/https://domesticheights.com/z-fold-card-template-tutorial/.

* cited by examiner

OFFSET SCORE CONFIGURATION

BACKGROUND

Greeting cards can have various elements that contribute to the card-opening experience. For example, some greeting cards can include additional card elements that are contained between card panels, such as pop-up structures that lay flat when the card is closed but then take on a three-dimensional configuration when the card panels are opened. However, such cards often tend to resist laying flat in a fully opened configuration. Accordingly, there is a need for a pop-up card designed to stay in a fully open configuration without additional help from external fasteners, adhesives or weights.

SUMMARY

The detailed description is related to greeting cards or other foldable articles that are conducive to displaying a pop-up in a fully open configuration with a flat base. For example, a greeting card having three panels (a front cover, a back cover and a protection panel in between) may be configured so that the back cover is hingedly coupled to the protection panel so that at least a portion of it is offset from the spine of the card formed by the fold connecting the front cover and the protection panel. This offset configuration permits the back cover to operate as a lockable lever that can keep the card in a fully open configuration, thereby providing a stable and flat base for the pop-up structure to be displayed in its fully expanded three-dimensional state.

In at least some examples, the protection panel can further comprise fasteners or tabs to allow it to attach to the inner surface of the front cover, so that the pop-up in its collapsed state is at least partially covered. The greeting card is thus able to be run through a printer without damaging the pop-up, allowing for the printing of additional custom or personalized messages (e.g., post-print) without interfering with the printer components or damaging the card's pop-up feature.

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

Additional objects, advantages, and novel features of the invention will be set forth in part in the description that follows, and in part will become apparent to those skilled in the art upon examination of the following, or may be learned by practice of the invention.

BRIEF DESCRIPTION OF THE SEVERAL VIEWS OF THE DRAWINGS

The present invention related to a foldable article are explained in more detail below with reference to these figures.

DESCRIPTION

Figure 1:
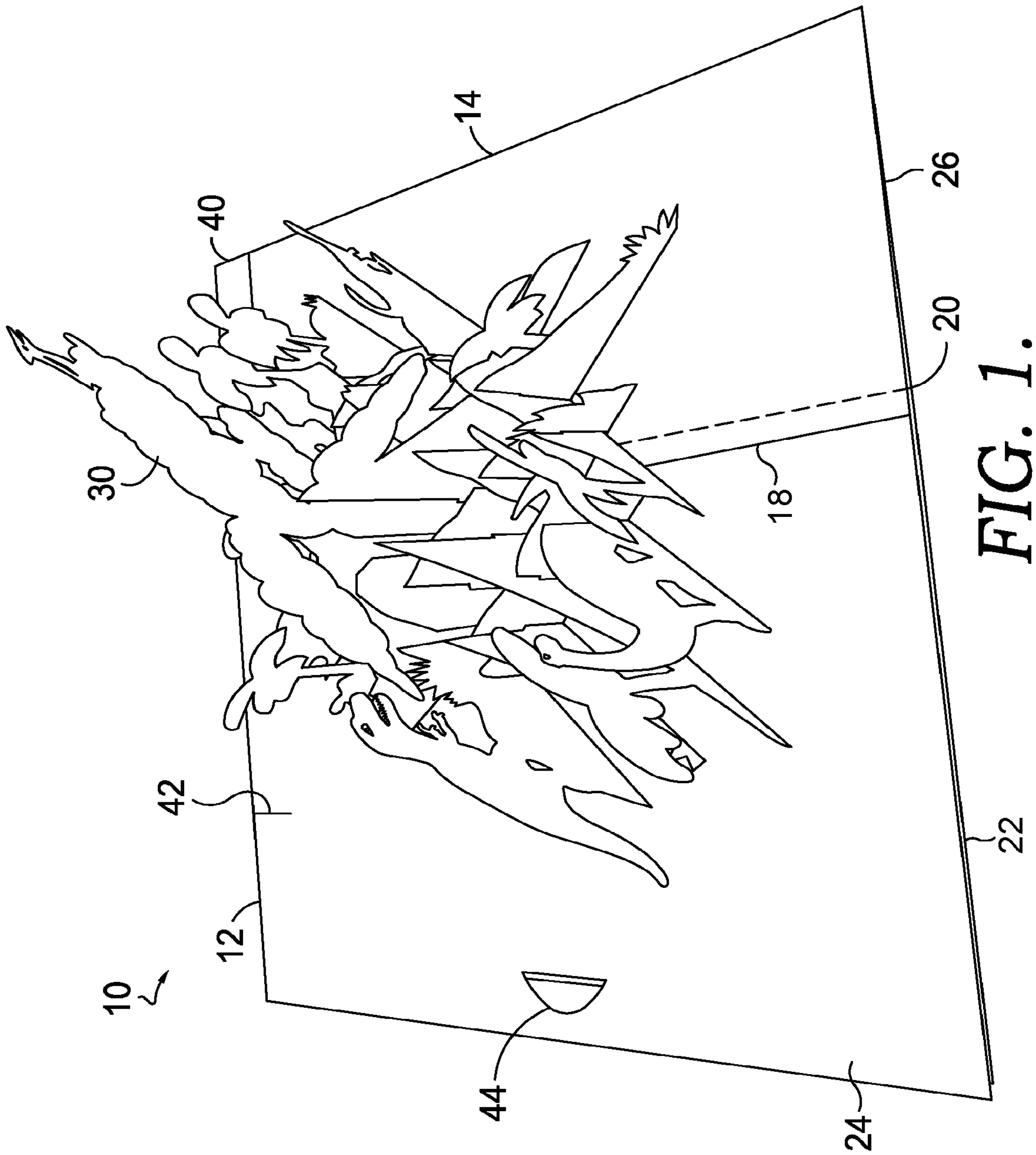
FIG. 1 is a perspective view of an exemplary foldable article, in accordance with an embodiment of the present invention, in a fully open position.

This detailed description is related to a greeting card or other foldable article that is conducive to displaying a collapsible pop-up contained in the foldable article in its fully open state. The foldable article has a front cover, a back cover, and a protection panel between them when in a closed state, with the front cover being hingedly coupled to the protection panel by a first fold and the back cover being hingedly coupled to the protection panel by a second fold, with the second fold being offset from the first fold. The positioning of the back cover relative to the other elements of the card turns the back cover into both a lever that can be used to initiate the deployment of other elements from a closed state, and a locking element so that the various card elements remain deployed in a fully open configuration.

In some examples, releasable fasteners can be used to releasably attach the protection panel to the inner surface of the front cover, so that the pop-up may be at least partially covered in its collapsed state. In this configuration, the protection panel can protect the pop-up during an automated personalization printing process, so that when the greeting card is fed into a printer, the front panel and protection panel can operate to reduce a likelihood of interference between the 3D card element and the printer components (e.g., rollers, guides, etc.).

Some aspects may be described using relative location terminology. For example, the term "proximate" is intended to mean on, about, near, by, next to, at, and the like. Therefore, when a feature is proximate another feature, it is close in proximity but not necessarily exactly at the described location, in some aspects. The term "substantially" when used in relation to angular orientation means within +5 degrees of a designated value. Thus, when an element is substantially parallel to another element, it may be nearly parallel but not exactly parallel. For example, when a card is in a fully closed state, each of the panels and/or planar elements of the decorative element may be oriented such that they extend in nearly parallel directions, but not necessarily in exact parallel alignment with one another.

Terms such as "attached," "secured," "affixed," and the like may mean elements that are releasably attached to one another using, for example, snap systems, slider systems, hook-and-loop closure systems, releasable adhesives, buttons, hooks, and the like. These terms may further mean elements that are permanently attached to one another using, for example, stitching, bonding, welding, taping, stapling, and the like. The term "releasable fastener" as used herein refers to a fastener system that can be repeatedly coupled and uncoupled to respectively secure or disengage components from each other.

A foldable article may include any two panels that can move relative to one another about a fold from a folded or closed state to an open state. For example, a foldable article may include a greeting card, a magazine, a book, and the like. The two panels may be connected to one another at a binding, in some aspects. In other aspects, the two panels may be integral to the foldable article and may comprise a unitary panel having a crease from one edge to an opposing edge. Other foldable articles may include more than two panels. For example, a unitary panel may be divided into three, four, or more subpanels that are each separated from adjacent subpanels by a crease. As used herein, the term "fold" refers to a segment about which two adjacent panels move relative to one another. For example, one of the panels may rotate about the fold.

As known to one skilled in the art, the term "paper mechanics" refers to a category of devices applied to foldable articles that cause motion upon opening of the foldable article. Although some paper mechanics are constructed from paper materials (e.g., paper strips), other paper mechanics are constructed from other materials (e.g., plastics, metal, wire, etc.). Several specific embodiments of paper mechanics will be discussed below with reference to the figures; however, it is envisioned that other types of paper mechanics known in the art may be useful for and with the present invention.

A "sliceform" may include a first plurality of planar elements coupled to a second plurality of planar elements, which are configured to move between a substantially two-dimensional, collapsed state and a substantially three-dimensional, expanded state. A variety of paper mechanics that can be used to move the sliceform between states are known in the art.

Having described some general examples of what this disclosure is related to, some more specific examples are now provided.

Referring now to FIGS. 1-4 a greeting card 10 includes a front cover 12 hingedly attached to a protection panel 16 at a first fold 18 and a back cover 14 hingedly attached to the protection panel 16 at a second fold 20. The front cover 12 has an outer face 22 and an inner face 24, and the back cover has an outer face 26 and an inner face 28.

Figure 2:
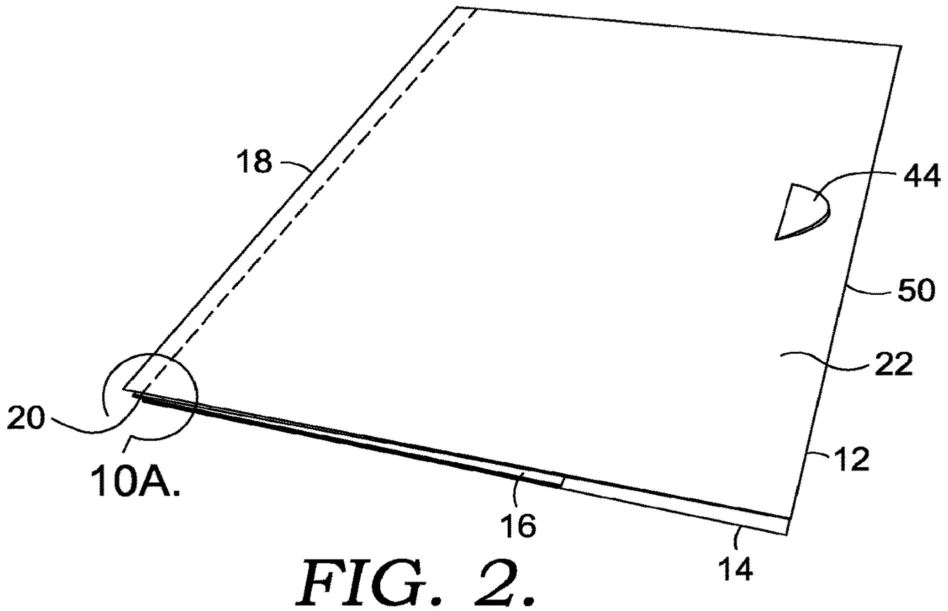
FIG. 2 depicts the foldable article of FIG. 1 in a fully closed configuration.

As shown in FIG. 2, in a fully closed position, the protection panel 16 is situated in between the front cover 12 and the back cover 14, with the second fold 20 connecting the back cover 14 to the face of the protection panel 16 adjacent to the back cover 14. In an aspect, the second fold 20 is generally parallel to the first fold 18 and slightly offset from the first fold 18 in a direction towards the free edge 52.

A decorative element 30 is positioned between the front cover 12 and the protection panel 16. In the greeting card of FIG. 1, the decorative element 30 is a 3D card element further depicted as a sliceform capable of popping up from a substantially two-dimensional configuration to a three dimensional configuration. The 3D card element 30 can be connected to the front cover 12 and/or the protection panel 16 using any number of known paper mechanics 32. In other examples, the 3D card element can include other types of pop-up structures, pockets, inserts, foldouts, giftcards, giftcard holders, origami, or other greeting card elements that, when the front cover 12 and protection panel 16 are closed, are positioned between the front cover 12 and the protection panel 16 and create a thickness in addition to the front cover 12 and protection panel 16. In still other aspects, the decorative element 30 may simply be a printed decoration, figure, or message on the front cover 12, the protection panel 16, or both.

Figure 3:
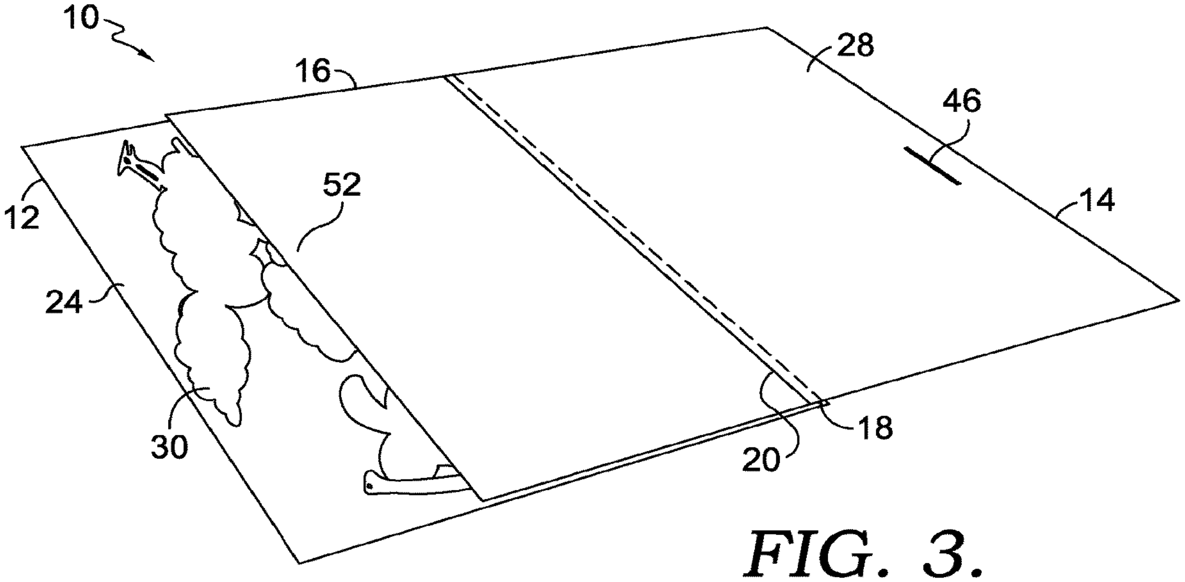
FIG. 3 depicts the foldable article of FIG. 1 in a half-open configuration for personalizing.
Figure 4:
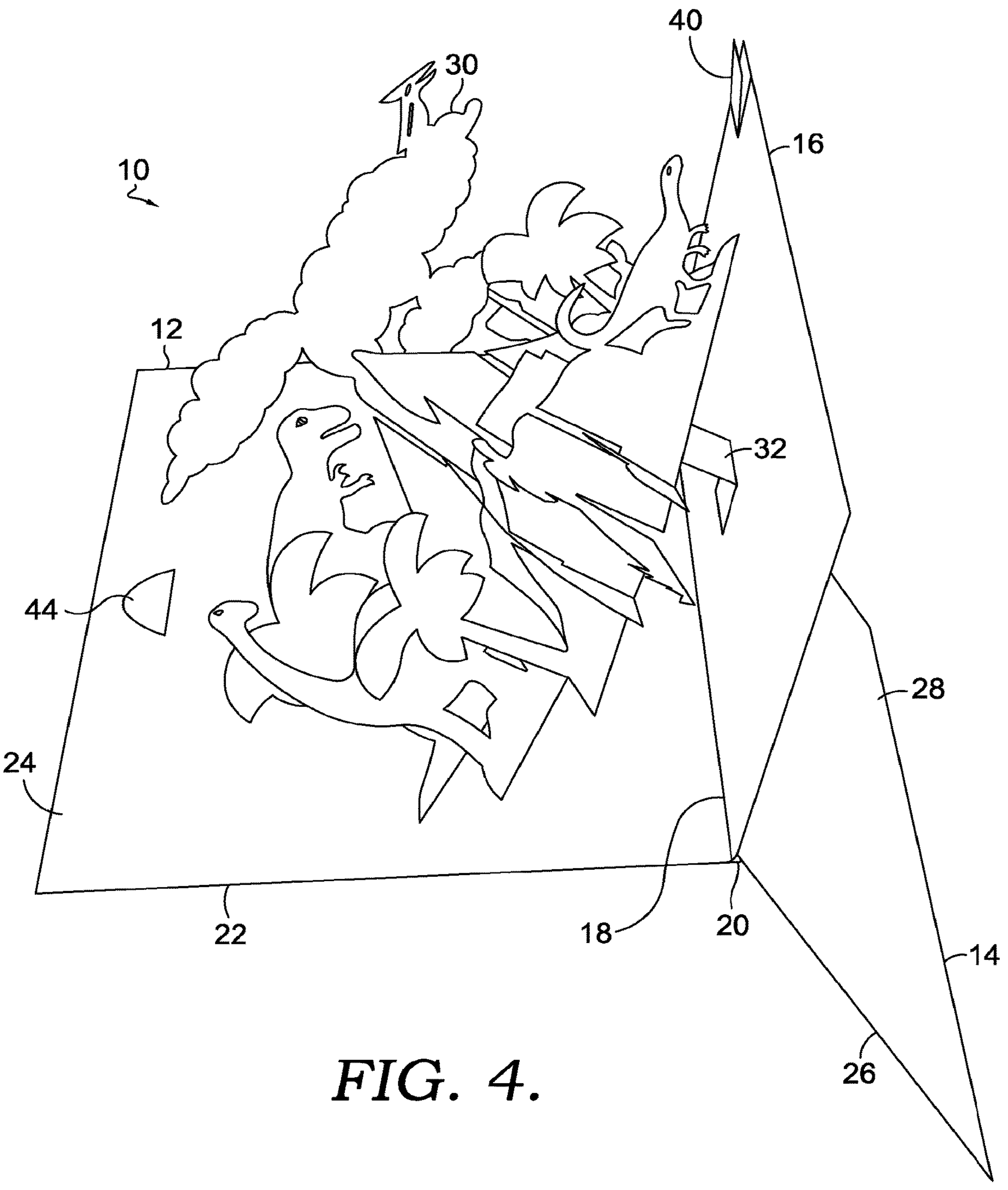
FIG. 4 depicts the foldable article of FIG. 1 in a more than half-open configuration and a transition phase between the positions illustrated in FIG. 3 and FIG. 1.

In at least one example, the greeting card 10 can provide, for a card recipient, a multi-stage opening experience. For instance, a first stage of the experience can include presentation of at least a graphic and/or first message on the outer face 22 of the front cover 12, such as when the greeting card 10 is in a closed position, as depicted in FIG. 2. A second stage of the experience can include, when the greeting card 10 is opened approximately 180 degrees by rotating the front cover 12 and the back cover 14 away from each other until they are generally coplanar, but the protection panel 16 remains closed, as depicted in FIG. 3, resulting in the presentation of the back cover's inner face 28 and the adjacent face of the protection panel 16, either or both of which could have been customized by the customer purchasing the card with, for example, a personalized message. Further, a third stage of the experience can include, when the protection panel 16 is opened, presentation of the 3D card element 30 (e.g., pop-up structure moving to, and presenting in, an expanded state) along with a message and/or graphic on the front cover inner surface 24, as depicted in FIG. 4.

In some examples, one or more releasable fasteners can be used to secure the protection panel 16 to the front cover 12 in its closed state to keep the protection panel 16 closed (e.g., during post manufacturing printing), until it is desired to open the protection panel 16 (e.g., during the card-opening experience). For example, the releasable fastener can be a tab 40 formed on or near one free corner of the protection panel 16 that can be inserted in a slot 42 formed in the front cover 12.

Figure 5:
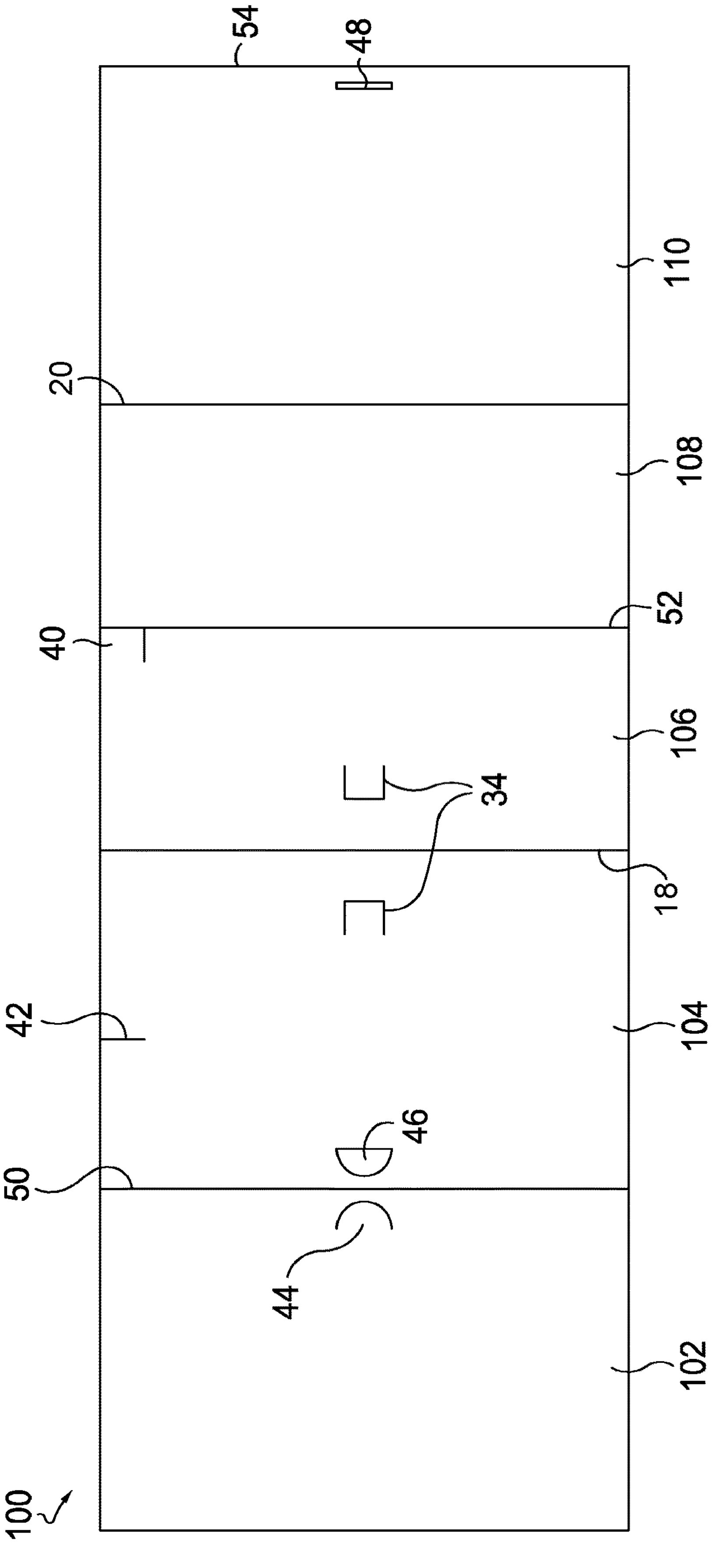
FIG. 5 is a top plan view of a card blank that can be used to form the foldable article of FIG. 1.
Figure 6:
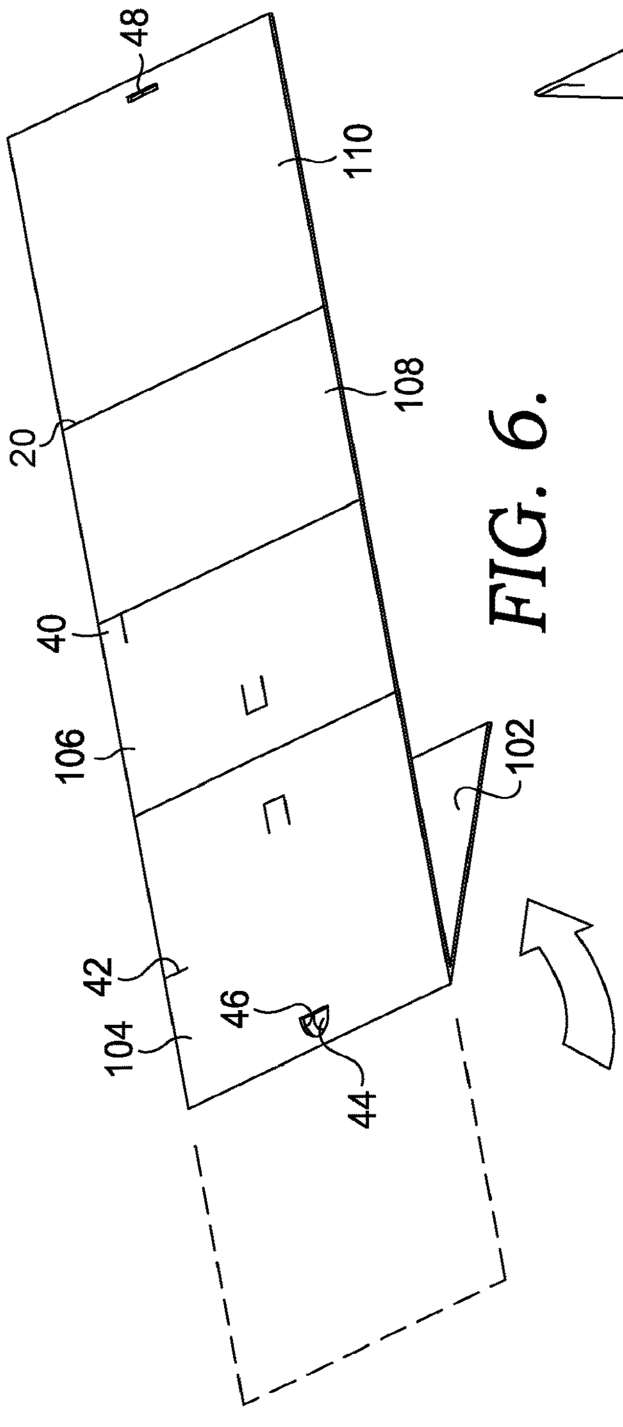
FIGS. 6-7 are perspective views of the card blank of FIG. 5 in different stages of folding and assembly.
Figure 7:
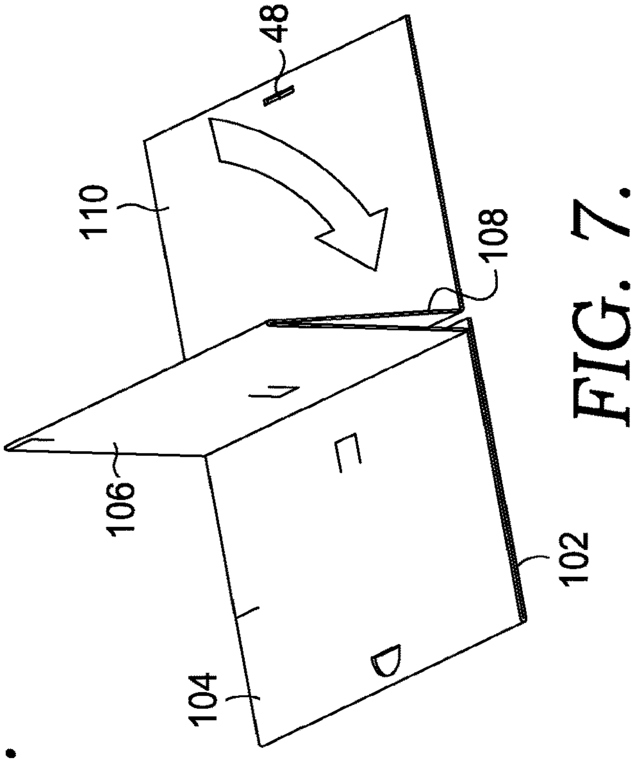

The front cover 12, protection panel 16, and back cover 14 of the card of FIG. 1 may be formed from a single piece of cardstock or other suitable material. As shown in FIGS. 5-7, a single piece of material 100 can be folded into five sections 102, 104, 106, 108, 110, the sections being created by four substantially parallel folds in an accordion-folding fashion. In this example, the first section 102 and second section 104 can be folded away from each other along crease 50 until back to back and affixed together to form the front cover 12, with crease 50 now forming the free edge of the front cover 12. Similarly, the third section 106 and fourth section 108 can be folded away from each other along crease 52 until back to back and affixed together to form the protection panel 16, with crease 52 now forming the free edge of the protection panel 16.

FIGS. 5-7 also show how various cutouts and slots can be made in the blank 100 to form the releasable connectors of the card, as well as attachment points 34 for the decorative element 30. For example, the cutout 46 in the second panel 104 allows for the user to be able to access the tab 44 formed in the first panel 102 when the panels are affixed to each other to form the front cover 12. The tab 44 may be inserted into a slot 48 formed in the back cover 14, as depicted in FIG. 1, when the greeting card 10 is opened 360 degrees such that the outside face 22 of the front cover 12 abuts outside face 26 of the back cover 14. Insertion of the tab 44 into the slot 48 helps to maintain the greeting card 10 in the fully opened display position of FIG. 1 where the decorative element 30 is fully expanded and the front cover 12 and protection panel 16 are generally co-planar and the back cover is generally parallel to the front cover 12 and the protection panel 16.

Figure 9:
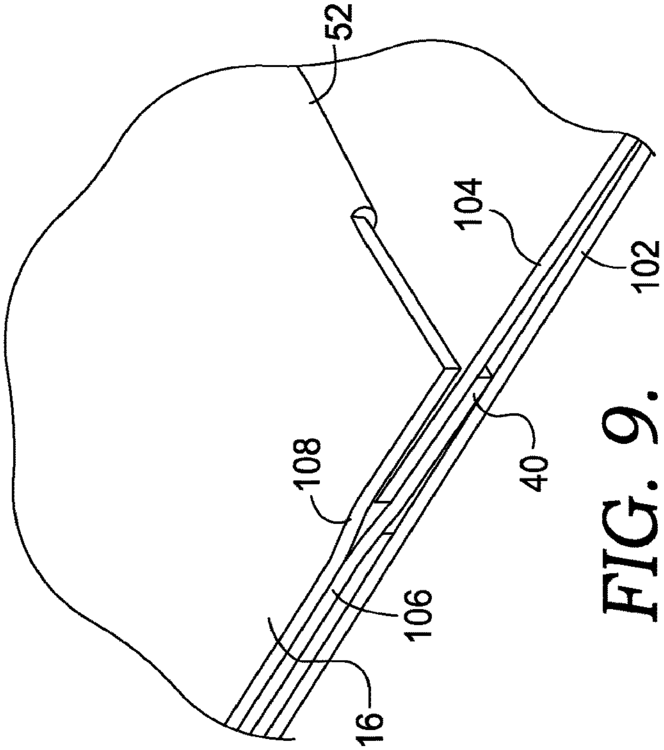
FIG. 9 is an enlarged, fragmentary view of the area 8 of the foldable article of FIG. 8 including the releasable fastener.
Figure 8:
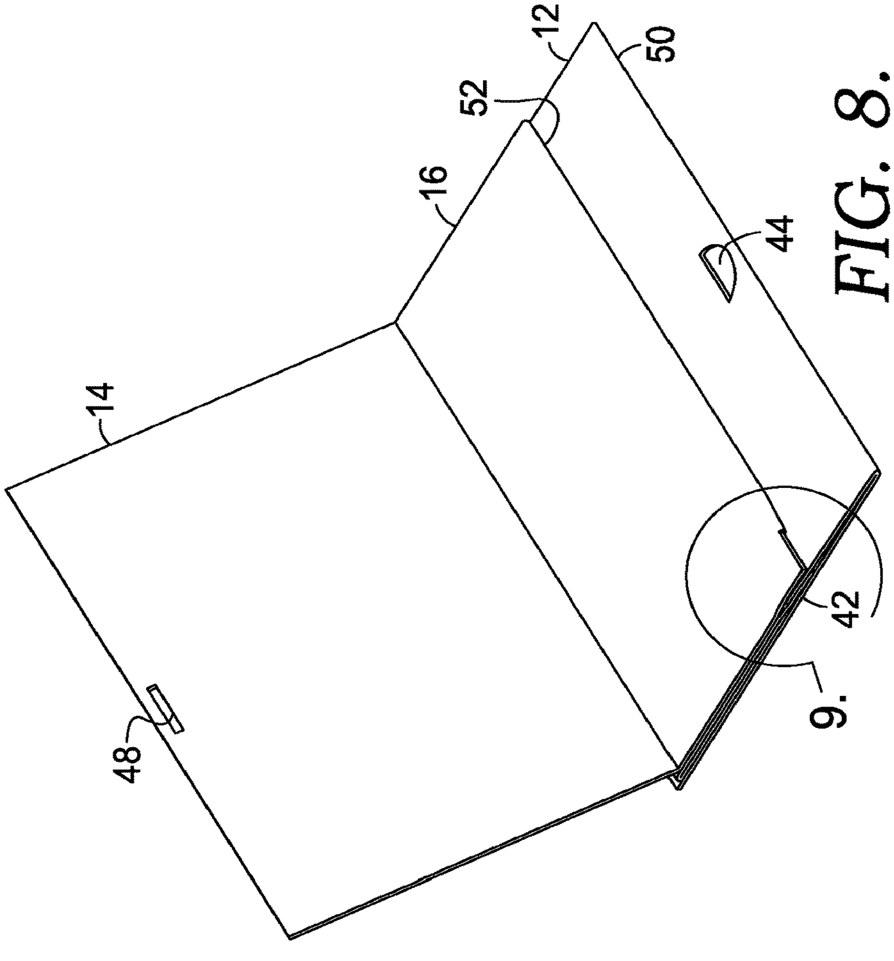
FIG. 8 is a perspective view of a foldable article configured with a releasable fastener.

FIGS. 8-9 show how the tab 40 of the third section 106 and the protection panel 16 can be releasably inserted into the slot 42 of the second section 104 and the front cover 12 to hold the protection panel 16 in a closed position (depicted in FIG. 3) with respect to the front cover 12. In other examples, the front panel 12 can include angled slots to receive (e.g., and temporarily hold) corners of the protection panel 16, such as when the protection panel 16 is closed and is containing or covering the 3D card element. In at least some examples, the card can include one or more photo corners (e.g., coupled to the front panel 12), and portions (e.g., corners) of the protection panel 16 can releasably insert into the photo corners to help retain the protection panel 16 in a closed configuration.

In the card blank 100 of FIGS. 5-7, the sections are dimensioned such that the first section 102 and second section 104 are approximately the same width, the third section 106 is less wide than the second section 104, and the fourth section 108 is slightly less wide than the third section 106. When the sections are subsequently folded towards each other and affixed as described above, it results in the protection panel 16 being less wide than the front cover 12, and the second fold 20 being offset from the first fold 18. Furthermore, in this example the card blank 100 is substantially rectangular, but one of skill in the art can appreciate that in other examples the card blank may have any desired shape in order to create the desired shapes for the card and/or its various components.

Figure 10A:
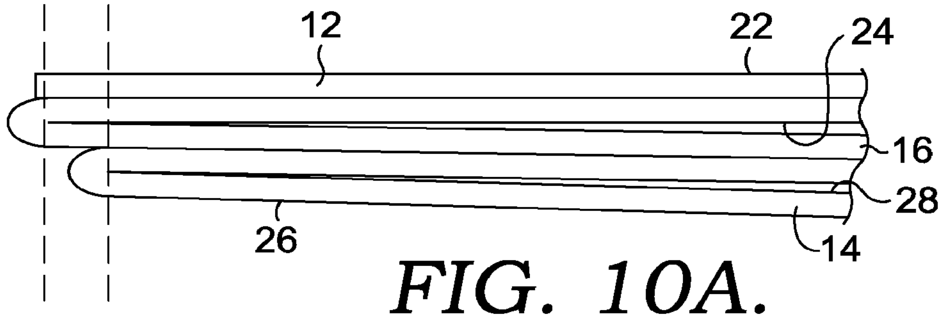
FIGS. 10A-E are side elevation views of the foldable article of FIG. 1 in different stages of opening.
Figure 10B:
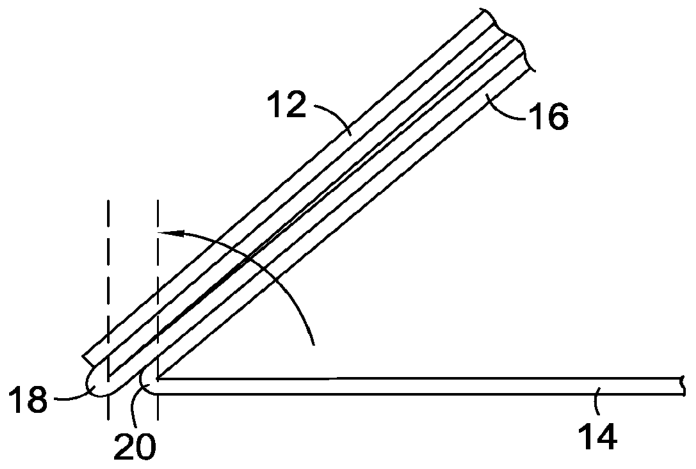
Figure 10C:
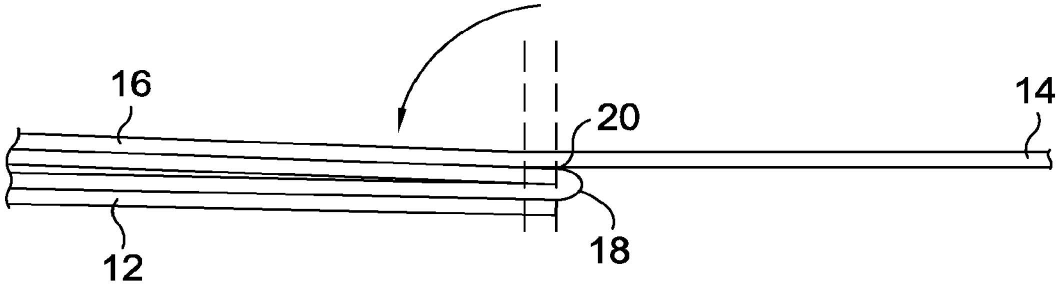
Figure 10D:
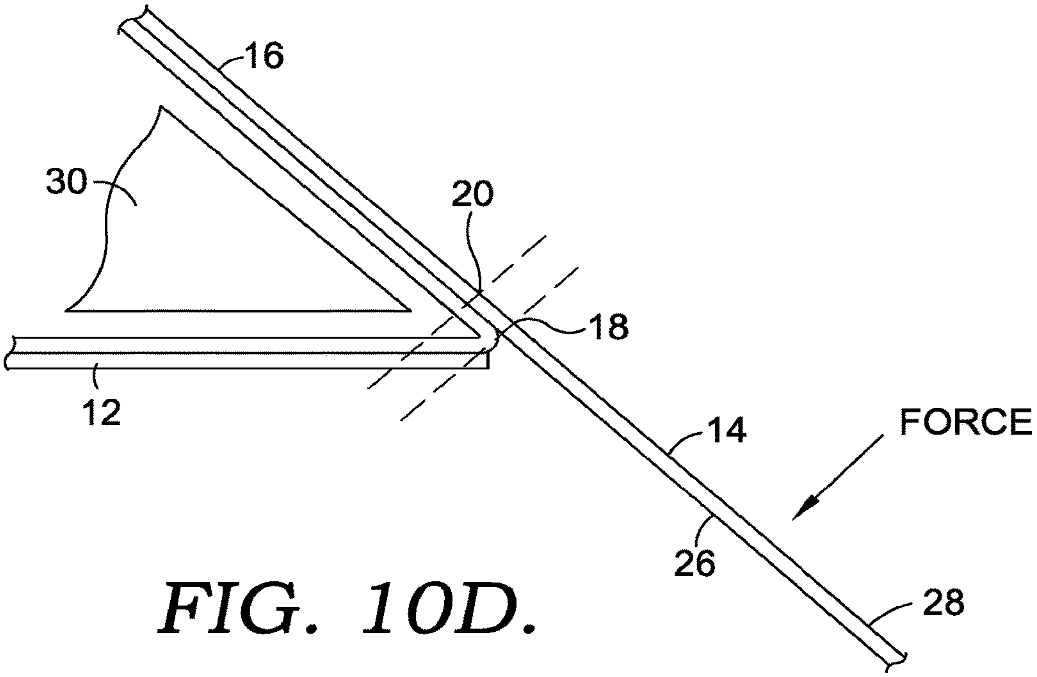
Figure 10E:
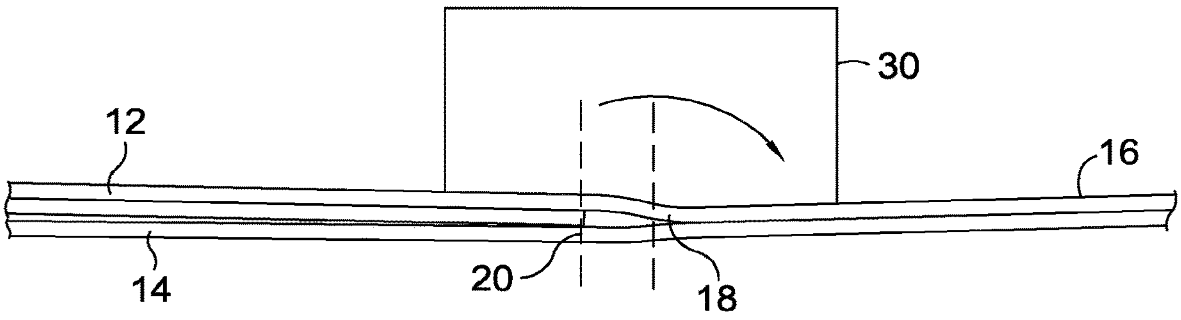

Referring to FIGS. 10A-10E, side elevation views illustrate the card 10 moving from a closed state (FIG. 2 and FIG. 10A), through a half open state where the front cover 12 and back cover 14 are generally coplanar (FIG. 3 and FIG. 10C), to the fully opened state where the front cover 12 and back cover 14 abut front to back (FIG. 1 and FIG. 10E). When the greeting card 10 is in the closed state, as depicted in FIG. 2, the decorative element 30 is in a substantially two-dimensional configuration, laying flat between the front panel 12 and the protection panel 16.

Turning to FIG. 10C, the foldable article 10 has moved from the closed state (FIG. 2) to a half open state (e.g., FIG. 3). The front cover 12 and protection panel 16 have been rotated away from the back cover 14 approximately 180 degrees. In this position, a user can easily write, and a recipient can easily read, a personalized message on the inside face 28 of the back cover 14 and/or the adjacent face of the protection panel 16. In another aspect of the present invention, the foldable article 30 in this configuration is protected and held closed by the protection panel 16 such that the greeting card 10 can also be processed through an "automated personalization machine" to print a personalized message on either or both of the inside face 28 of the back cover 14 and/or the adjacent face of the protection panel 16 (sometimes known in the art as a post-print application).

In FIG. 10D, the greeting card 10 has moved past the half-open state to a mostly open state (FIG. 4). The back cover 14 has been rotated further away from the front cover 12 so that its outside face 26 of the back cover 14 is approximately 135 degrees away from the outside face of the front cover 12. As shown in FIG. 10D, applying an orthogonal force to the inside face 28 of the back cover 14 creates a torque around the first fold 18 that rotates the protection panel 16 around the first fold 18. It can be appreciated that when the greeting card 10 is in the half-open position of FIG. 10C, applying a sufficient amount of orthogonal force in the same manner will eventually cause the releasable fastener 40 holding the protection panel 16 closed against the front cover 12 to be released, revealing the decorative element 30 and allowing it to expand or otherwise assume its full display configuration as the protection panel 16 continues to rotate around the first fold 18 until it is parallel to and generally coplanar with the front cover 12, as depicted in FIGS. 1 and 10E.

FIG. 10E (and FIG. 1) illustrates the foldable article 10 in the fully open state. The back panel 14 has been rotated approximately 360 degrees from its closed position, so that its outer face 26 now substantially abuts the outside face 22 of the front cover 12 and the protection panel 16 has been rotated away from its closed position approximately 180 degrees from the front cover 12. The decorative element 30 is now in its fully expanded state, and the front cover 12, protection panel 16, and back cover 14 together form a substantially flat base.

In this fully open configuration the back cover 14 is now also substantially parallel to the front cover 12, with their outer faces 22, 26 facing and abutting each other. The front cover 12 and back cover 14 may be configured to be releasably fastened to each other in this position. In this example, the front cover 12 has a semi-circular tab 44 that can be inserted into the slot 48 in back cover 14, as depicted in FIG. 1. Thus, the card 10 is now locked into its fully open display configuration, and the front cover 12, the back cover 14 and protection panel 16 form a substantially flat base that can now lay flat on a table or other surface without needing to weigh it down or use adhesives or other additional methods or tools to keep it flat and open.

Figure 11:
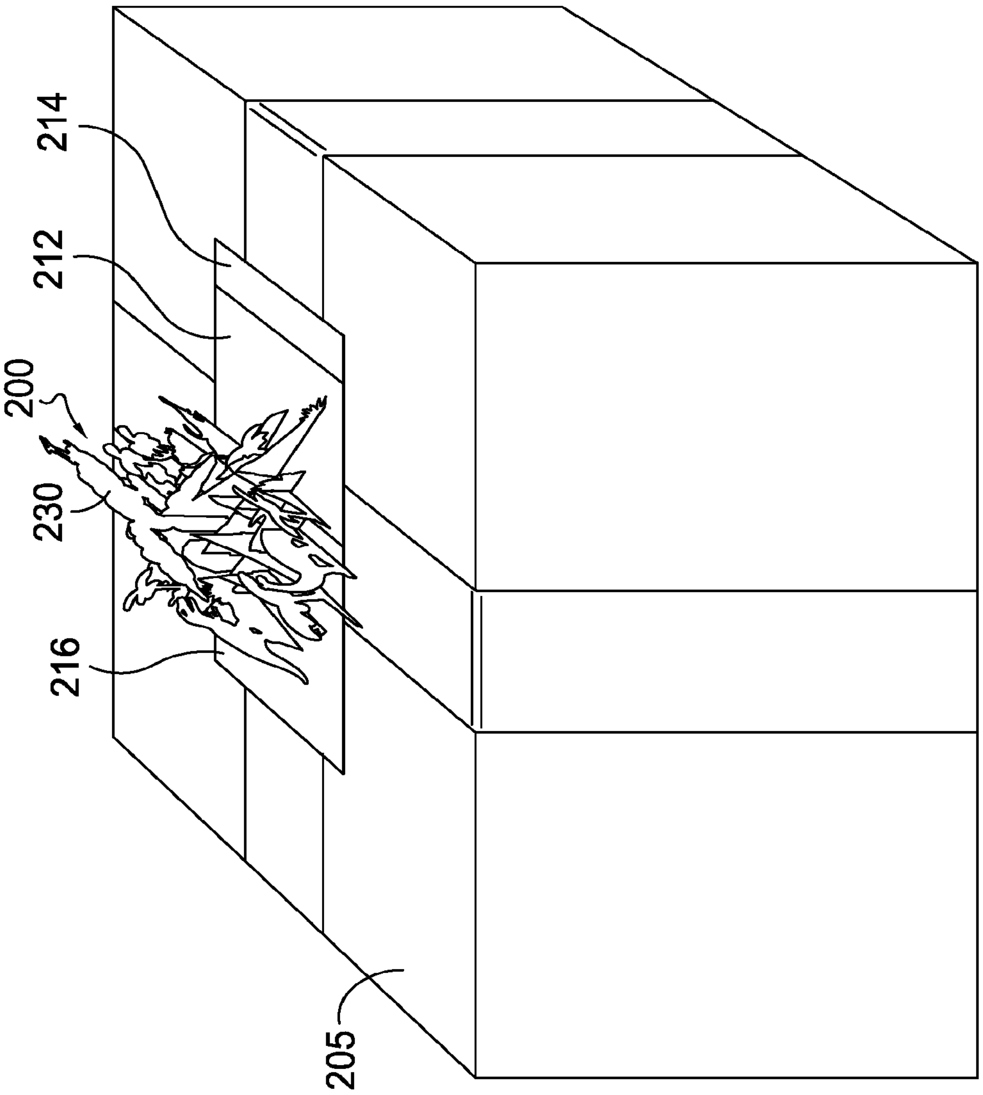
FIGS. 11-12 are a perspective views of an exemplary foldable article in accordance with a second embodiment of the present invention in different configurations.
Figure 12:
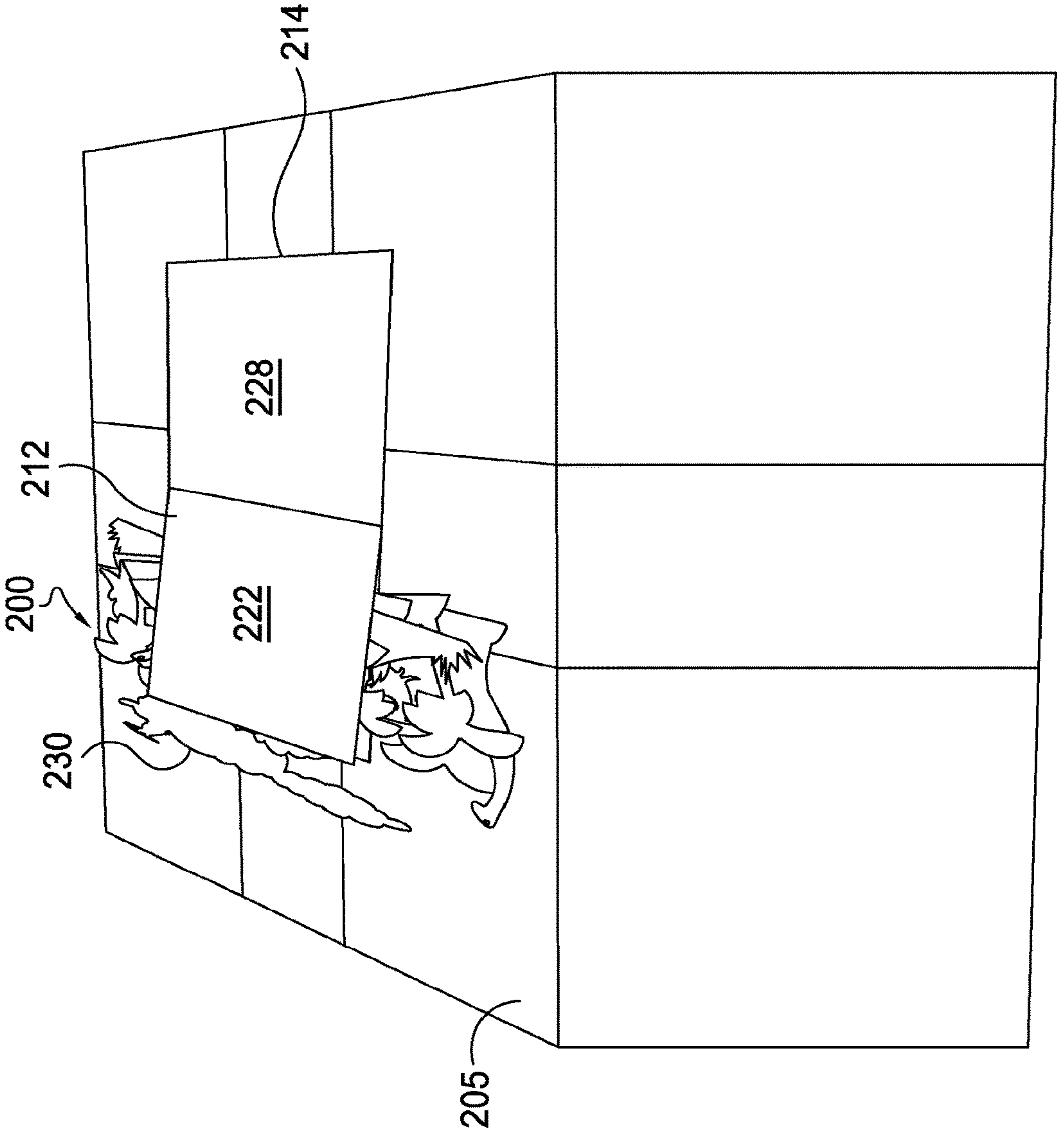

In another aspect of the present invention, illustrated in FIGS. 11 and 12, the greeting card 10 may be reduced in size and used as a To/From card 200 on a wrapped gift or present 205. In this embodiment the foldable article 230 may be used as a gift tag or gift trim, as a replacement for a bow, or as a standalone décor piece that can be packaged flat but then expanded and locked into place, allowing for rapid deployment without needing a lot of other supplies, like tape, glue or weights, to have the base of the décor element lay flat and remain fully open. In some examples, "peel-and-stick" adhesive tags (not shown) may also be affixed to one or more of the card's surfaces that would abut the surface to which the trim or décor 200 will be attached to.

In some examples, the back cover 214 may be wider than the front cover 212, which may allow them to more easily be releasably attached to each other. In this example, it may be more advantageous to configure the gift tag 200 so that the message can be written on an outer face 222 of the front cover 212 and/or an inner face 228 of the back cover 214, and then hidden by securing the front cover 212 to the back cover 214. It can be seen by one of skill in the art that such examples could also receive post-print personalization treatment via a printer.

This detailed description is provided in order to meet statutory requirements. However, this description is not intended to limit the scope of the invention described herein. Rather, the claimed subject matter may be embodied in different ways (including those not shown), to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof. Alternative means of implementing the aforementioned can be completed without departing from the scope of the claims below. Certain features and sub-combinations are of utility, may be employed without reference to other features and subcombinations, and are contemplated within the scope of the claims.

What is claimed is:

1. A foldable article comprising:

a first fold between a front cover and a protection panel, and a second fold between the protection panel and a back cover;

the front cover having a first outer face and a first inner face;

the back cover having a second outer face and a second inner face;

the protection panel having a front-cover-facing face, a back-cover-facing face, and a distal edge opposite the first fold; and a decorative element positioned between the front cover and the protection panel when the protection panel is in a closed position;

wherein the second fold is located along the back-cover-facing face of the protection panel, wherein the first fold is located along the front-cover-facing face of the protection panel, and wherein the second fold is offset along the protection panel from the first fold;

wherein the protection panel hinges via the first fold between a closed position, in which the protection panel overlays the front cover, and an open position, in which the protection panel is splayed outward relative to the front cover, and wherein the back cover hinges via the second fold between a closed position, in which the first inner face of the front cover and the second inner face of the back cover are substantially facing each other, and a fully open position, in which the first outer face of the front cover and the second outer face of the back cover are substantially facing each other.

2. The foldable article of claim 1, wherein the second fold is substantially parallel to the first fold.

3. The foldable article of claim 1, wherein the foldable article is a greeting card.

4. The foldable article of claim 3, wherein the decorative element is a three-dimensional (3D) card element.

5. The foldable article of claim 4, wherein the three-dimensional (3D) card element moves from a substantially two-dimensional collapsed configuration when the protection panel is in its closed position to a three-dimensional expanded configuration when the protection panel is in its open position.

6. The foldable article of claim 5, where in the three-dimensional (3D) card element is a sliceform.

7. The foldable article of claim 5, wherein the front cover can be releasably fastened to the back cover when the back cover is in its fully open position.

8. The foldable article of claim 7, wherein the back cover can further be configured in a half-open position when the first inner face of the front cover and the second inner face of the back cover are facing in substantially a same direction.

9. The foldable article of claim 8, wherein the protection panel can be releasably fastened to the first inner face of the front cover.

10. The foldable article of claim 9, wherein the protection panel is capable of maintaining its closed position when the back cover is in its half-open position.

11. The foldable article of claim 10, wherein the foldable article can be fed into a printer when the protection panel is in its closed position and the back cover is in its half-open position.

12. The foldable article of claim 1, wherein the front cover, the protection panel and the back cover are integrally formed from a single piece of cardstock.

13. A method of forming a greeting card having a front cover, a protection panel, and a back cover, comprising the steps of:

folding a piece of cardstock accordion-style into five consecutive sections comprising a first section, a second section, a third section, a fourth section, and a fifth section, each of the five consecutive sections having a front face and a back face;

affixing the back faces of the first and second sections together to form the front cover;

affixing the back faces of the third and fourth sections together to form the protection panel; and attaching a decorative element between the front cover and the protection panel;

wherein the third section is slightly wider than the fourth section.

14. The method of claim 13, wherein the front cover is wider than the protection panel.

15. The method of claim 13, wherein an adhesive is used to connect the back faces of the first and second sections and the back faces of the third and fourth sections together.

16. The method of claim 13, wherein the decorative element is a three-dimensional (3D) card element.

17. The foldable article of claim 16, wherein the three-dimensional (3D) card element can move from a substantially two-dimensional collapsed configuration to a three-dimensional expanded configuration.

18. The method of claim 17, further comprising a step of adding at least one releasable fastener in the protection panel to releasably fasten the protection panel to the front cover.

19. The method of claim 18, wherein the step of adding the at least one releasable fastener in the protection panel comprises forming a tab in the protection panel.

20. A method of forming a greeting card having a front cover, a protection panel, and a back cover, comprising the steps of:

folding a piece of cardstock accordion-style into five consecutive sections comprising a first section, a second section, a third section, a fourth section, and a fifth section, each of the five consecutive sections having a front face and a back face;

affixing the back faces of the first and second sections together to form the front cover; and affixing the back faces of the third and fourth sections together to form the protection panel;

wherein the third section is slightly wider than the fourth section;

wherein the front cover is wider than the protection panel.

* * * * *